(12) United States Patent
Adachi et al.

(10) Patent No.: US 7,500,758 B1
(45) Date of Patent: Mar. 10, 2009

(54) CAMERAS AND VIDEO PLAYERS HAVING IMAGE PROJECTION CAPABILITIES

(75) Inventors: Hiroyuki Adachi, Simi Valley, CA (US); Norihiko Morimoto, Simi Valley, CA (US)

(73) Assignee: Sanyo Electric Co., Ltd., Moriguchi (JP)

( * ) Notice: Subject to any disclaimer, the term of this patent is extended or adjusted under 35 U.S.C. 154(b) by 875 days.

(21) Appl. No.: 10/793,075

(22) Filed: Mar. 4, 2004

(51) Int. Cl.
*G03B 21/14* (2006.01)

(52) U.S. Cl. ............................... 353/101; 353/98; 349/5

(58) Field of Classification Search ................... 353/28, 353/101, 100, 122, 119, 39, 43, 21; 348/744, 348/745, 756, 787, 788, 794, 795, 211.13, 348/383, 552; 349/7, 11, 16, 57, 58
See application file for complete search history.

(56) References Cited

U.S. PATENT DOCUMENTS

| | | | |
|---|---|---|---|
| 5,258,844 A | 11/1993 | Nakayama et al. | |
| 5,300,976 A | 4/1994 | Lim et al. | |
| 5,315,334 A | 5/1994 | Inana | |
| 5,528,297 A | 6/1996 | Seegert | |
| 5,673,084 A | 9/1997 | Lim et al. | |
| 6,292,305 B1 | 9/2001 | Sakuma et al. | |
| 6,431,711 B1* | 8/2002 | Pinhanez | 353/69 |
| 7,092,045 B2* | 8/2006 | Haruna et al. | 348/745 |
| 2002/0176015 A1 | 11/2002 | Lichtfuss | |
| 2004/0017548 A1* | 1/2004 | Denmeade | 353/31 |
| 2005/0088631 A1* | 4/2005 | Dwyer et al. | 353/101 |

FOREIGN PATENT DOCUMENTS

| WO | WO 03/079678 A1 | 9/2003 |
|---|---|---|
| WO | WO 03/079678 A1 * | 9/2003 |

* cited by examiner

*Primary Examiner*—William C. Dowling
(74) *Attorney, Agent, or Firm*—Masuvalley & Partners

(57) ABSTRACT

Projection capabilities are provided in consumer electronic devices that are used for the capture or reproduction of images, such as digital still image cameras, digital video cameras, cellular telephones, DVD players and other digital video players. Such devices can display images to several people simultaneously in a manner that is more convenient than the use of miniature onboard displays. The incorporation of image projection capabilities also enables image generation to be provided by the device itself without the necessity of an independent display device.

5 Claims, 14 Drawing Sheets

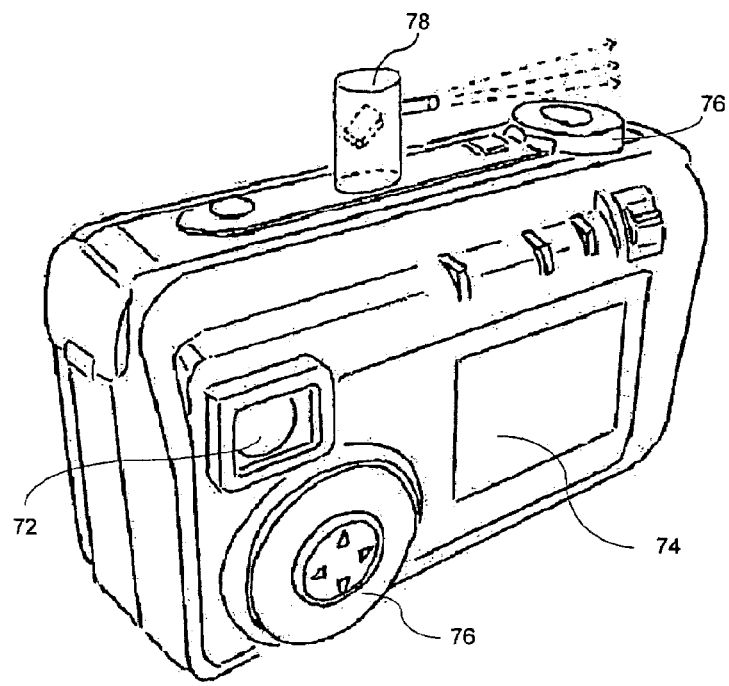
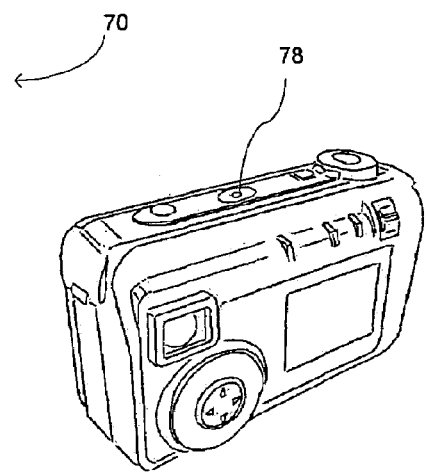
Figure 4aFigure 4b
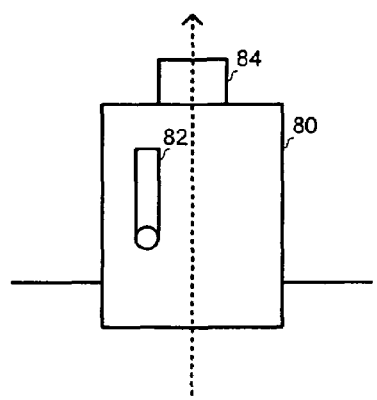
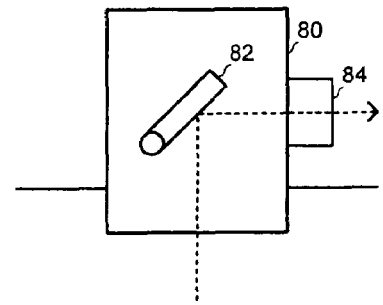
Figure 5aFigure 5b

CAMERAS AND VIDEO PLAYERS HAVING IMAGE PROJECTION CAPABILITIES

BACKGROUND OF THE INVENTION

1. Field of the Invention

Embodiments of the invention relate to consumer electronic devices such as digital still image cameras, digital video cameras, cellular phones and DVD players, and more particularly to consumer electronic devices having image projection capabilities.

2. Related technology

Today's consumers enjoy a wide variety of electronic devices that allow the user to record or reproduce images. Digital still cameras allow the user to take photographs that are digitized and stored as data in a computer readable medium. Cellular telephones have begun to incorporate digital camera features as well. Digital video cameras are also becoming more prevalent and provide similar recording and storage features for video images. Both digital still cameras and digital video cameras typically have the capability of interfacing with a video monitor such as a television or computer to display stored images.

Video reproduction devices such as DVD players are also commonplace. These devices are typically used in conjunction with a separate television or other video monitor to display the video images stored on the DVD.

Consumer electronic devices such as the aforementioned devices all require a way of displaying images that are recorded by or rendered by the devices. Currently such displays are provided by display screens that are integral with the device, or by display devices such as televisions that must be connected to the device. This imposes limitations on the usefulness of these devices. In devices that have built in displays, such as cameras, the displays are typically very small and cannot display images that are easily viewable by several people at the same time. In devices such as DVD players that require connection to a separate display, the use of the device is typically restricted to an area near the display to which the device is connected.

SUMMARY OF THE INVENTION

Embodiments in accordance with the invention provide projection capabilities in various types of well-known consumer electronic devices that are used for the capture or reproduction of images. Such consumer electronic devices may include digital still image cameras, digital video cameras, cellular telephones, DVD players and other digital video players. By incorporating image projection capabilities into these devices, the devices can display images to many people simultaneously in a manner that is more convenient than the use of miniature onboard displays. The incorporation of image projection capabilities also enables image generation to be provided by the device itself without the necessity of a separate display device.

In accordance with first embodiments of the invention, projection capabilities may be integrated with a camera. The projection capabilities may be provided by positionable projection optics that may be moved with respect to the camera body to change the direction in which an image is projected. Processing of the image data within the camera may be performed to properly orient the projected image based on the position of the projection optics with respect to the camera. These features may be integrated with a digital still camera, a digital video camera, or a cell phone having image recording or display capabilities.

In accordance with one aspect of the first embodiments, a device for image display may comprise positionable projection optics that are integral with the device body and movable with respect to the device body for projecting an image in different directions with respect to the device body, a projection display for generating an image to be projected by the projection optics, a light source for directing light through the projection display toward the projection optics, a position sensor for detecting the position of the projection optics with respect to the device body, and an image translator for translating image data supplied to the projection display in accordance with a signal from the position sensor indicating the position of the projection optics so that the image displayed on the projection display produces a projected image that is correctly oriented with respect to the device.

In accordance with another aspect of the first embodiments, an image display device operating method may include detecting the position of positionable projection optics of the image display device with respect to the image display device, translating image data for an image to be displayed in accordance with a signal indicating the position of the projection optics, forming an image on a projection display using the translated image data, and projecting the image formed on the projection display, wherein the translation of the image data causes the projected image to maintain a predetermined orientation with respect to the device irrespective of the position of the positionable projection optics.

In accordance with another aspect of the first embodiments, a computer readable medium may store programming instructions for controlling an image display device to perform operations that include detecting the position of positionable projection optics of the image display device with respect to the image display device, translating image data for an image to be displayed in accordance with a signal indicating the position of the projection optics, forming an image on a projection display using the translated image data, and projecting the image formed on the projection display, wherein the translation of the image data causes the projected image to maintain a predetermined orientation with respect to the device irrespective of the position of the positionable projection optics.

In accordance with second embodiments of the invention, projection capabilities may be integrated with a camera by providing a separate projector portion that is tethered to the camera by a cable. The projector portion may be held in the user's hand to direct a projected image at a desired target. These features may be integrated with a digital still camera, a digital video camera, or a cell phone having image recording or display capabilities.

In accordance with one aspect of the second embodiments, a device for image capture and display may comprise a device body including an image sensor, image capture optics for directing an image onto the image sensor, and image data storage for storing data representing a captured image, and a hand-held projector portion that is coupled to the device body by a flexible cable for projecting an image stored in the image data storage.

In accordance with third embodiments of the invention, projection capabilities may be integrated with a video player such as a DVD player. The projection capabilities may be provided in a projector portion that is receivable by and separable from the body of the player. In a connected mode, data and power are supplied through physical couplings from the player to the projector portion, and in a disconnected mode, power is supplied separately to the projector portion and data is transmitted wirelessly from the player to the projector portion.

In accordance with one aspect of the third embodiments, a digital video player may comprise a player portion for reading a digital video storage medium and generating video data, and a projector portion for receiving the video data and generating a projected image from the video data, wherein the player portion is comprised of a first housing and the projector portion is comprised of a second housing that is coupleable to the first housing, wherein the player portion and the projector portion include physical interfaces for transmitting video data and power from the player portion to the projector portion when the projector portion is coupled to the player portion, and wherein the player portion and the projector portion include wireless data interfaces for transmitting video data from the player portion to the projector portion when the projector portion is not coupled to the player portion.

In accordance with another aspect of the third embodiments, a method of operating a digital video player may include detecting whether a projector portion of the video player is coupled to a player portion of the video player, if the projector portion is coupled to the player portion, providing video data to the projector portion through a direct coupled transmission path, if the projector portion is not coupled to the player portion, transmitting video data to the projector portion through a wireless data link, and projecting an image from the projector portion using the video data.

In accordance with another aspect of the third embodiments, a computer readable medium may store programming instructions for controlling a digital video player to perform operations comprising detecting whether a projector portion of the video player is coupled to a player portion of the video player, if the projector portion is coupled to the player portion, providing video data to the projector portion through a direct coupled transmission path, and if the projector portion is not coupled to the player portion, transmitting video data to the projector portion through a wireless data link.

In accordance with another aspect of certain embodiments of the invention, a method of operating a camera may comprise receiving an image at an image detector of the camera, storing data representing the image, and projecting an image from an image projection portion of the camera using the stored data so that a captured image is concurrently projected by the camera.

In accordance with another aspect of certain embodiments of the invention, a computer readable medium may store programming instructions for controlling a camera to perform operations comprising receiving an image at an image detector of the camera, storing data representing the image, and projecting an image from an image projection portion of the camera using the stored data so that a captured image is concurrently projected by the camera.

DESCRIPTION OF THE DRAWINGS

A detailed description of embodiments of the invention will be made with reference to the accompanying drawings, wherein like numerals designate corresponding parts in the several figures.

FIGS. 4a and 4b show an example of a digital still camera in accordance with the first embodiments of the invention.

FIGS. 5a and 5b show elements of positionable projection optics of the embodiment of FIGS. 4a and 4b.

DETAILED DESCRIPTION OF EXEMPLARY EMBODIMENTS

First Embodiments

First embodiments of the invention may be implemented as video cameras, still cameras, or other devices that have camera functions and that are capable of projecting images. In general terms, these embodiments include projection elements that are integral with the camera and moveable with respect to the camera body, enabling the direction of image projection to be changed with respect to the camera body.

Figure 1:
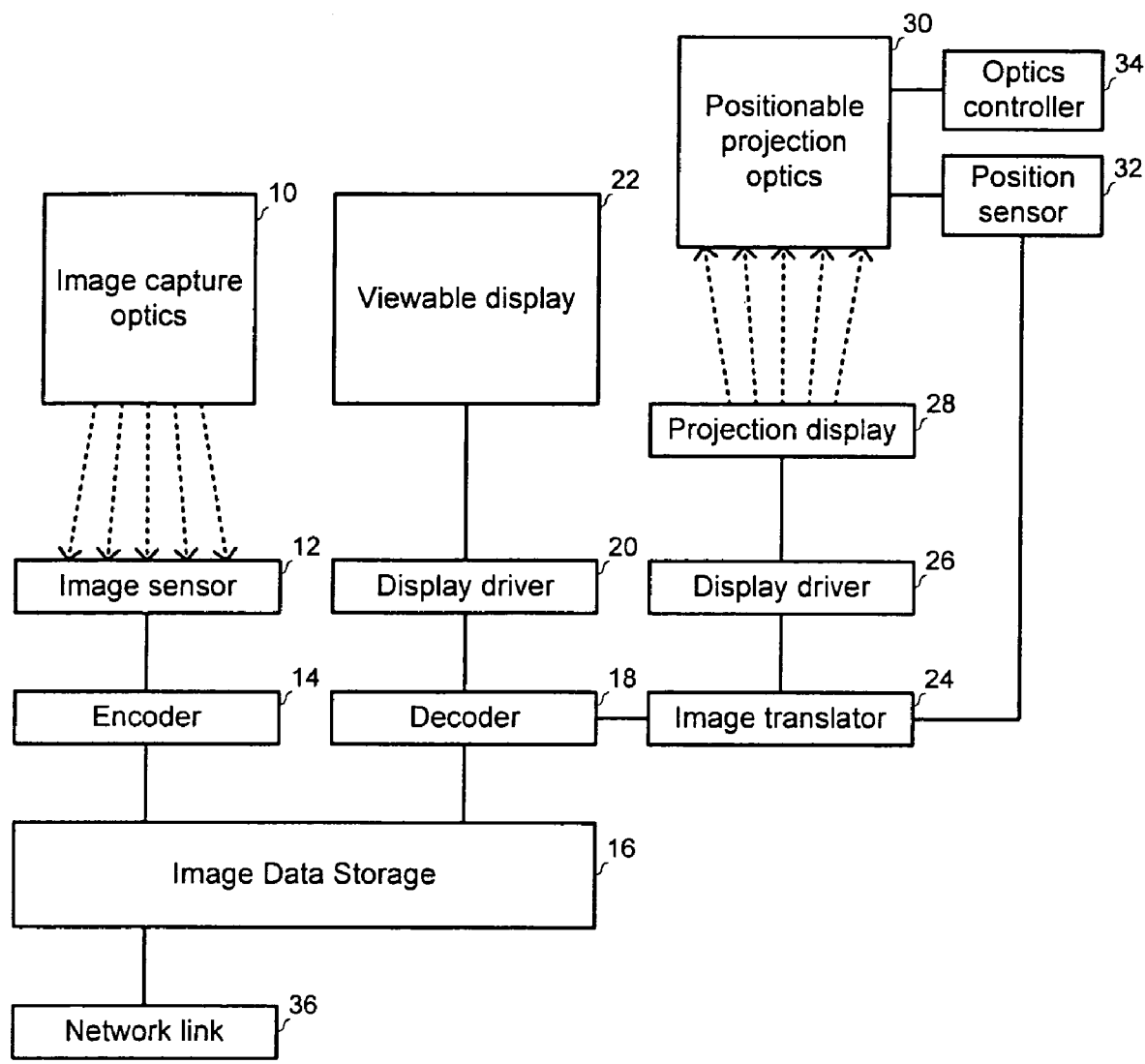
FIG. 1 shows an example of components of devices in accordance with first embodiments of the invention.

FIG. 1 shows a block diagram of electronic components and other components that may be used in implementations of such embodiments of the invention. The components of FIG. 1 include image capture optics 10 that focus an image onto an image sensor 12. The image capture optics 10 are typically implemented using one or more lenses and the image sensor 12 is typically implemented using a CCD or CMOS device. Signals generated by the image sensor 12 are supplied to an encoder 14 that converts the image signals into a digital representation of the received image. The encoder 14 may be a still image encoder, a video encoder, or an encoder having both still image and video encoding capabilities. Image data from the encoder 14 is stored in an image data storage 16. The image data storage 16 may be implemented using a variety of storage media, such as random access memory, fixed or removable non-volatile semiconductor memory, writable digital versatile disc (DVD) memory, or other data storage media. The image data storage may encompass a memory section where "live" incoming image data is temporarily held, as well as long-term storage where image data may be archived. Image data stored in the image data storage 16 may be accessed and decoded by a decoder 18. The decoder 18 may supply decoded image data to a display driver 20 that drives a viewable display 22. The viewable display 22 is typically a miniature LCD display that is used as a viewfinder of the camera.

The components of FIG. 1 further include a network link 36 that is coupled to the image data storage 16 for supplying image data and related data to the image data storage 16. The network link 36 may be implemented for a variety of data communication protocols such as serial ports or wired or wireless networks including wireless LANs and cellular telephone networks.

In accordance with first embodiments of the invention, image data stored in the camera may be used to generate a projected image using projection optics that are integral with the camera and movable with respect to the camera body. Elements for providing this capability are shown in FIG. 1. These elements include an image translator 24 that performs operations on image data supplied by the decoder 18 to rotate and flip the image as needed so that the projected image is properly oriented irrespective of the position of the projection optics. The image translator 24 may be implemented using image mapping algorithms that are executed by a programmable microprocessor. The image translator 24 supplies translated image data to a display driver 26 that drives a projection display 28. The projection display 28 is typically implemented as a miniature LCD display through which light is projected to produce a projectable image. Light passing through the projection display 28 is received by positionable projection optics 30 that focus and direct the image. A position sensor 32 associated with the positionable projection optics 30 detects the orientation of the projection optics 30 with respect to the camera body and provides a signal to the image translator 24 representing the orientation of the projection optics 30. The position sensor 32 may be implemented, for example, using contact sensors that sense the presence of the positionable projection optics at various positions. The position sensor 32 may also be implemented using one or more variable resistors that change resistance depending on the orientation of the positionable projection optics 30. An optics controller 34 may also be associated with the positionable projection optics 30. The optics controller 34 is an electronic or electromechanical device for controlling the position of elements within the projection optics 30 in response to control signals generated by the user. In alternative embodiments, the optics controller may be a purely mechanical device.

While the components shown in FIG. 1 provide an example of an implementation in accordance with the first embodiments, it will be understood that alternative components may be utilized to provide the features of the first embodiments. For example, while FIG. 1 shows the use of an encoder 14 and a decoder 18, alternate embodiments may use other forms of image data that do not require encoding and decoding, such as bitmap image data.

In operation, devices in accordance with FIG. 1 may receive and store still or video images. These images may be viewed on the viewable display 22 and may be projected by the projection optics 30. The projected image may be a "live" image that is projected as it is being received, or may be a stored image that was previously received and stored. The user of the device may move the projection optics 30 to a variety of positions with respect to the camera, either manually or through the use of electromechanical controls, so as to control the direction in which the projected image is pointed. The orientation of the projection optics 30 is detected by the position sensor 32, which supplies an orientation signal to the image translator 24. The image translator 24 performs image translation based on the orientation signal so that the image presented on the projection display 28 produces a properly oriented image.

Figure 2:
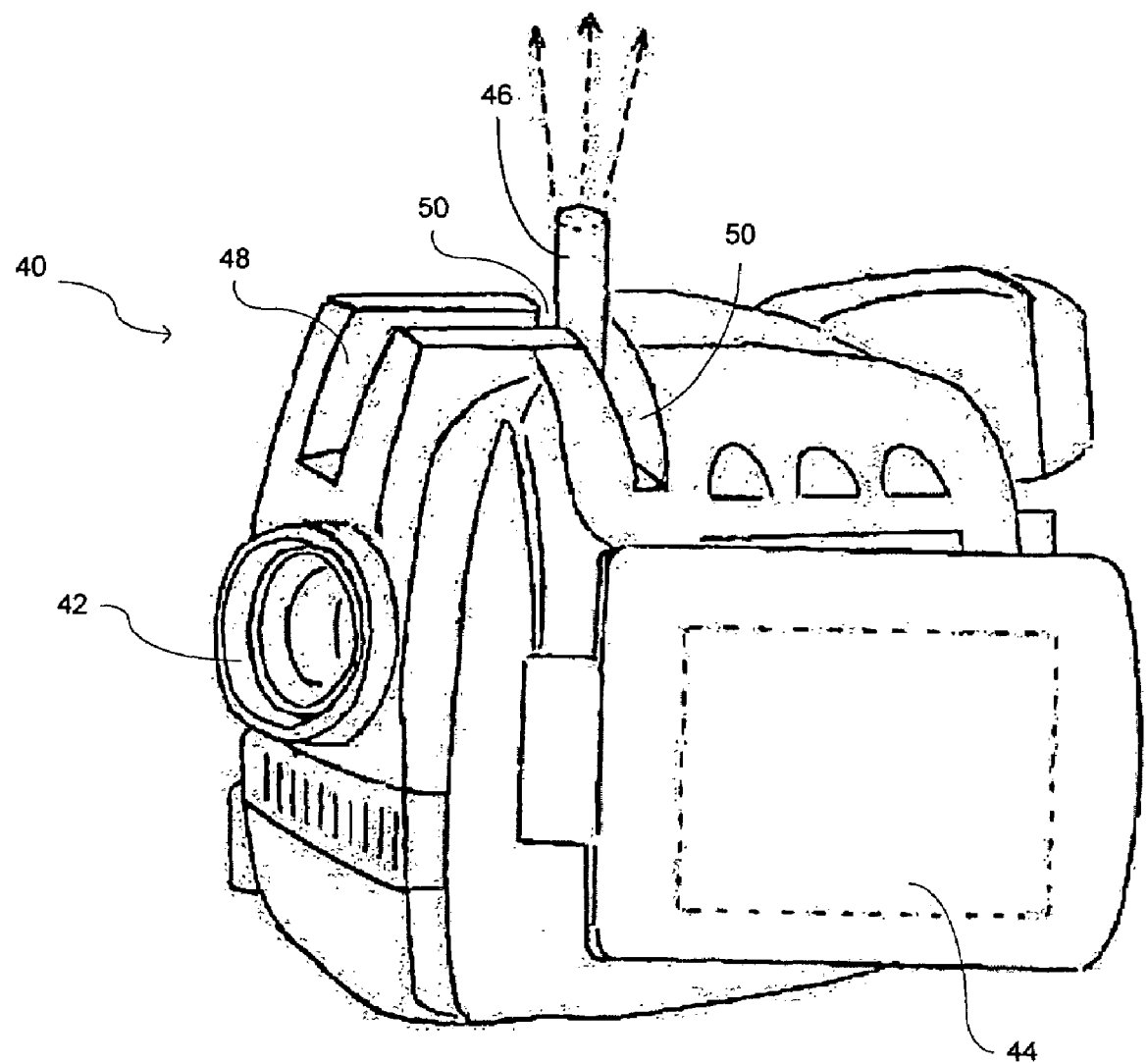
FIG. 2 shows an example of a video camera in accordance with the first embodiments of the invention.

FIG. 2 shows an exemplary embodiment using components as illustrated in FIG. 1. This embodiment is implemented in a digital video camera 40. The digital video camera 40 includes conventional elements such as image capture optics 42 and a viewfinder 44. The digital video camera 40 further includes a projection lens 46. The projection lens 46 is movable among various fixed positions with respect to the body of the camera. In the illustration of FIG. 2, the projection lens 46 points upward with respect to the camera body but is moveable to other positions that point forward, to the right, or to the left of the camera body. The projection lens 46 is movable to these positions through slots 48, 50. The projection lens 46 may be moved to the different positions manually or may be moved electromechanically in response to operation of user controls.

Figure 3A:
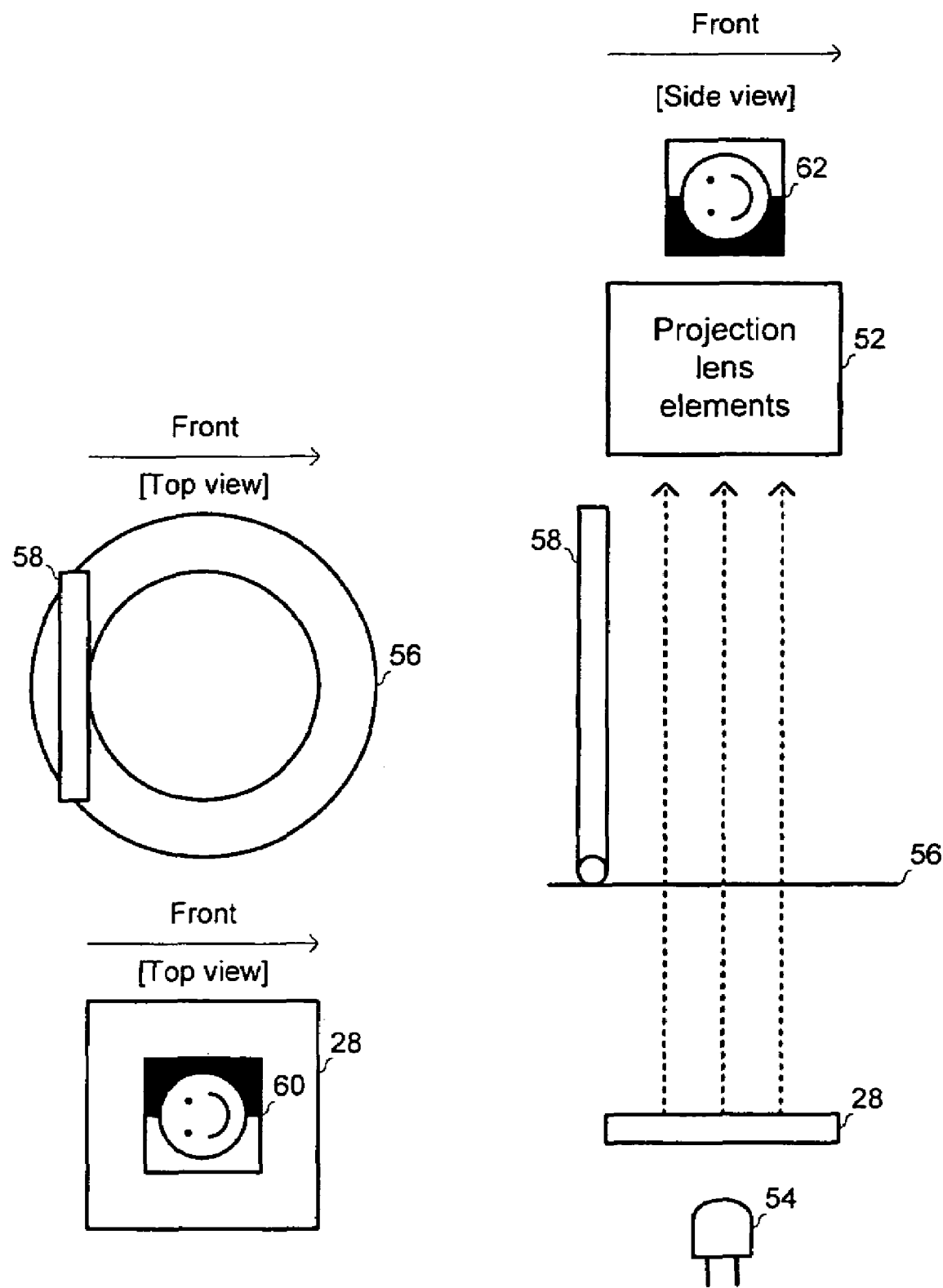
FIGS. 3a, 3b, 3c and 3d show examples of components of positionable projection optics in accordance with the first embodiments of the invention.
Figure 3B:
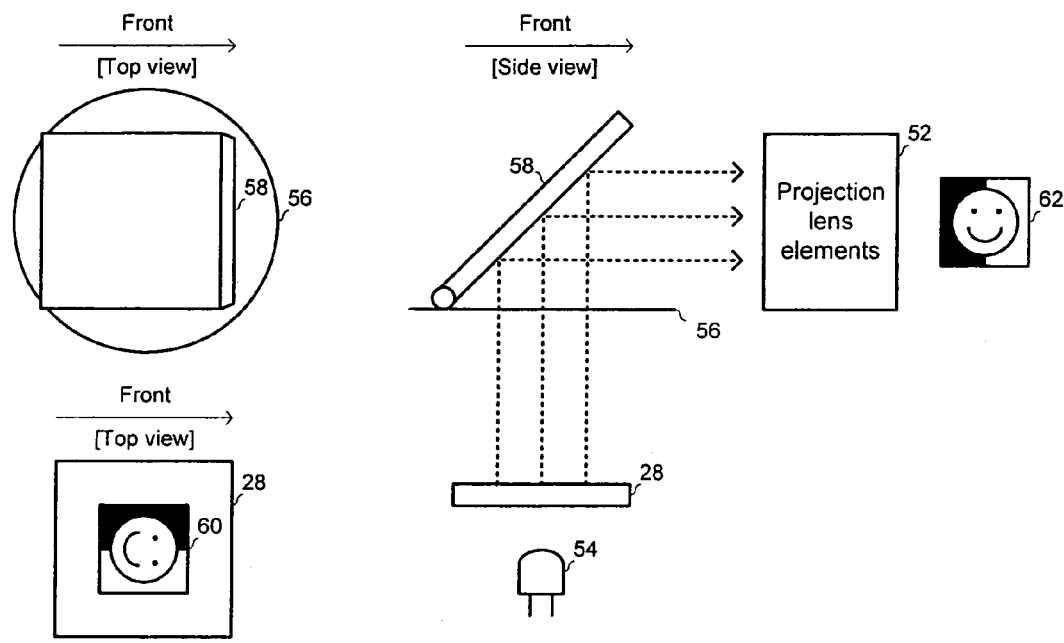

An exemplary implementation of the positionable projection optics 30 and related components in accordance with first embodiments of the invention such as that of FIG. 2 is illustrated in FIGS. 3a through 3d. As seen in FIG. 3a, the positionable projection optics include projection lens elements 52 that receive and focus light passed through the projection display 28. The projection lens elements 52 typically include one or more lenses that focus the projected image through movement of the lenses. Light is supplied to the projection display 28 by a light source 54 that is positioned behind the projection display 28, such as a lamp or a high powered LED such as a super-bright white LED. The positionable projection optics further include a ring 56 that surrounds and is rotatable about the optical path between the projection display 28 and the projection lens elements 52. A mirror 58 is mounted to the ring 56 and is pivotable with respect to the ring 56 such that it can be moved between a position that is approximately perpendicular to the ring, as shown in FIG. 3a, and a position that is at approximately a 45 degree angle to the ring 56, as shown in FIG. 3b. When the mirror 58 is perpendicular to the ring 56, it is outside of the optical path and does not affect the projected image. When the mirror 58 is pivoted to a 45 degree angle with respect to the ring, it is within the optical path and causes the optical path to be diverted at a 90 degree angle.

The mirror 58 and the ring 56 may be mechanically coupled to the projection lens elements 52 so that movement of the projection lens elements 52 produces a corresponding movement of the mirror 58 and rotation of the ring 56. Alternatively, the mirror 58 and ring 56 may be moved automatically by an electromechanical control system that also moves the projection lens elements 52 or that operates in response to manual movement of the projection lens elements 52.

For purposes of the embodiments described herein, it is assumed that the projection display 28 is mounted so that its broad surfaces are parallel to the bottom of the camera. However in further embodiments the projection display 28 may be mounted in a different orientation and its operation and the operation of the positional projection optics may be altered accordingly.

FIG. 3a shows the positionable projection optics in a first orientation corresponding to the up position in the camera of FIG. 2, in which the projection lens elements are pointed up with respect to the camera body so that an image is projected upward. In this orientation, the mirror 58 is positioned outside of the optical path. This enables an image 60 formed on the projection display 28 to be projected upward from the camera. The image 60 displayed on the projection display 28 is oriented by the image translator to produce a correctly oriented projection image 62 based on the position of the projection lens elements 52, the ring 56, and the mirror 58.

FIG. 3b shows the positionable projection optics in a second orientation corresponding to the forward position in the camera of FIG. 2, in which the projection lens elements 52 are pointed forward with respect to the camera body so that an image is projected forward. In this orientation, the mirror 58 is positioned within the optical path at a 45 degree angle to the ring 56 so that light directed upward through the projection display 28 is deflected forward at approximately a 90 degree angle. The reflection produced by the mirror inverts the image formed on the projection display 28. Consequently, the image translator operates to invert the image 60 formed on the projection display 28 so that the projection image 62 is properly oriented when it exits the projection lens elements 52. This translation may be seen by comparison of FIGS. 3b and 3a.

Figure 3C:
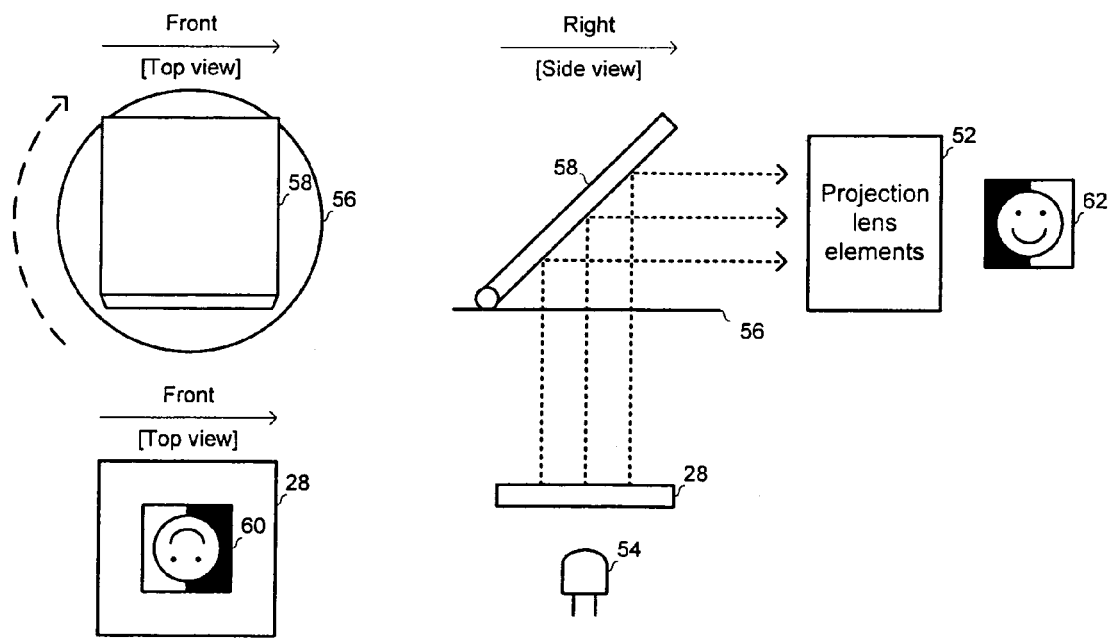

FIG. 3c shows the positionable projection optics in a third orientation corresponding to the right side position in the camera of FIG. 2, in which the projection lens elements 52 are pointed toward the right side with respect to the camera body so that an image is projected to the right of the camera body. In this orientation, the mirror 58 is positioned within the optical path at a 45 degree angle to the ring 56, and the ring 56 is rotated about the optical path by 90 degrees with respect to its position when the lens elements 52 are in the forward position. This rotation of the ring causes of the mirror 58 to reflect light to the right of the camera. Rotation of the ring also causes the projected image 62 to be rotated 90 degrees from its orientation when projected using the forward position. Consequently, the image translator operates to rotate the image 60 formed on the projection display 28 by 90 degrees in response to the rotation of the ring 56, and to invert the image in response to the position of the mirror 58. Thus the projection image 62 is properly oriented when it exits the projection lens elements 52. This translation may be seen by comparison of FIG. 3c to FIGS. 3a and 3b.

Figure 3D:
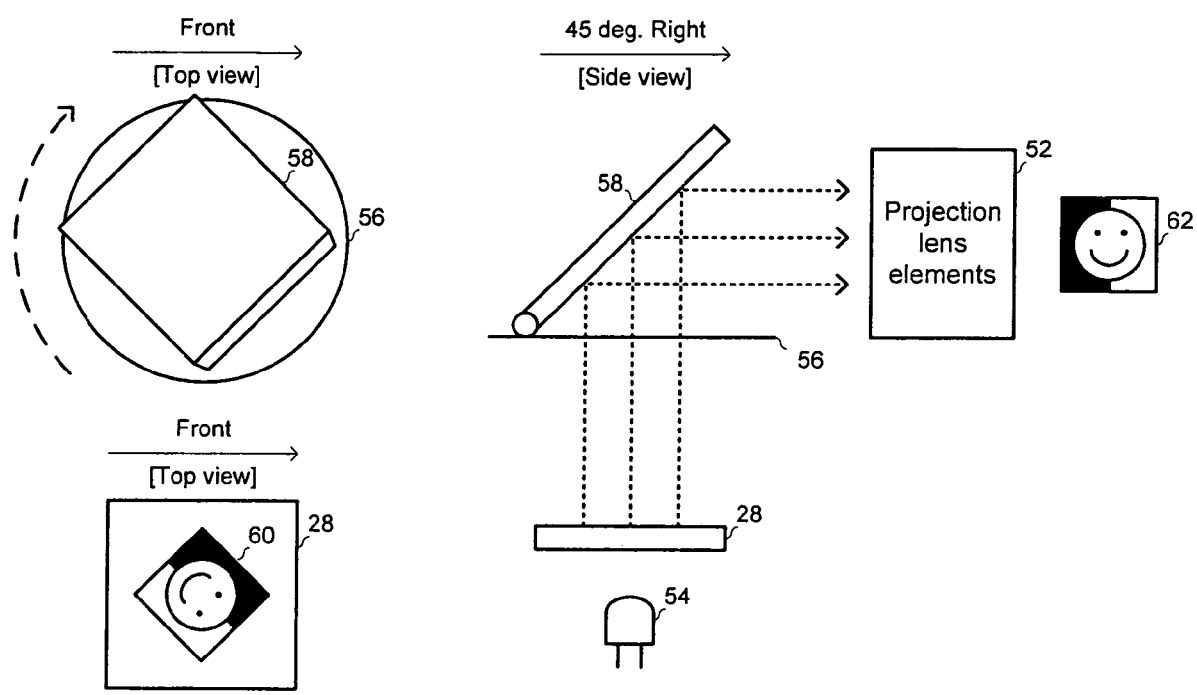

FIG. 3d shows the positionable projection optics in a fourth orientation in which the projection lens elements 52 are pointed at a 45 degree angle between the front and right side of the camera body. Although this orientation is not achievable by the camera of FIG. 2, further embodiments discussed below employee alternative projection optics that enable 360 degree rotation of the projection lens elements with respect to the camera body. In the orientation shown in FIG. 3d, the mirror 58 is positioned within the optical path at a 45 degree angle to the ring 56, and the ring 56 is rotated about the optical path by 45 degrees with respect to its position when the lens elements 52 are in the forward position. Rotation of the ring 56 causes the projected image to be rotated 45 degrees from its orientation when projected using the forward position. Consequently, the image translator operates to rotate the image 60 formed on the projection display 28 by 45 degrees in response to the rotation of the ring 56, and to invert the image in response to the position of the mirror 58. Thus the projection image 62 is properly oriented when it exits the projection lens elements 52. This translation may be seen by comparison of FIG. 3d to FIGS. 3a and 3b.

While the use of a ring to support the mirror is preferred for the embodiment shown in FIG. 2, alternative structures may be used to support the mirror in a manner that allows it to be moved into and out of the optical path and rotated about the optical path.

Further, while the embodiment of FIGS. 3a-3d utilize a simple reflecting mirror 58 that moveable into and out of the optical path, in alternative embodiments an electro-optical reflection device may be used in place of the mirror. The electro-optical reflection device is electrically controllable to transition between a primarily transmissive state and a primarily reflective state. This allows the electro-optical reflection device to remain in the optical path at all times and to be switched between reflective and transmissive states depending on the orientation of the projection lens elements. The electro-optical reflective device may be implemented using an LCD shutter device that is electronically switchable between a transmissive state and a reflective state.

FIGS. 4a through 4b show another exemplary embodiment using components as illustrated in FIG. 1. This embodiment is implemented in a digital still camera 70. The digital still camera 70 includes conventional elements such as an optical view finder 72, an LCD view finder 74, and user controls 76. The digital still camera 70 further includes a projection lens section 78. The projection lens section 78 is movable between an upward-pointing position and a sideward-pointing position, and when in the sideward-pointing position the projection lens may be rotated 360 degrees with respect to the camera body. The projection lens 78 may be manually moved by the user or may move electromechanically in response to operation of controls by the user. In the illustration of FIG. 4a the projection lens section 78 is shown protruding from the camera body, however the projection lens section 78 is also storable in a retracted position such as shown in FIG. 4b.

Details of the projection lens section 78 are shown in FIGS. 5a and 5b. FIG. 5a shows the projection lens section 78 in the upward-pointing position. The projection lens section includes an outer housing 80 within which is contained a pivotable mirror 82. The housing 80 is rotatable with respect to the camera body, and the mirror 82 is coupled to the housing 80 so as to be rotatable with the housing. Projection lens elements 84 are also coupled to the housing 80 and are pivotable with respect to the housing. In the upward-pointing position as shown in FIG. 5a, the lens elements 84 are pivoted to an upward-pointing position, and the mirror 82 is pivoted out of the optical path. Consequently, light entering the bottom of the housing 78 passes directly through the housing 80 and out of the upward-pointing lens elements 84 to project an image upward from the camera. In contrast, in the sideward-pointing position shown in FIG. 5b, the lens elements 84 are pivoted to a sideward-pointing position, and the mirror 82 is pivoted into the optical path at a 45 degree angle. Consequently, light entering the bottom of the housing 78 is deflected by the mirror 82 at a 90 degree angle with respect to its original path toward the sideward-pointing lens elements 84 to project an image sideways from the camera. Position sensors track the rotational position of the housing 78 and the position of the mirror 82 and provide a signal to the image translator, allowing the image produced by the projection display to translated in a manner that produces a properly oriented display.

While the embodiment of FIGS. 4a through 4b shows the use of a conventional reflecting mirror the projection optics, in alternative embodiments an electro-optical reflective device may be substituted for the mirror 82, as described above. Further, while the embodiment of FIGS. 4a through 4b shows the use of the projection optics of FIGS. 5a through 5b in a still image camera, similar projection optics may be implemented in a video camera.

Figure 6A:
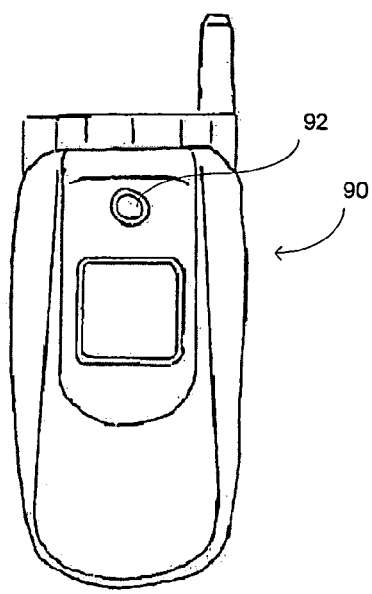
FIGS. 6a and 6b show an example of a cell phone in accordance with the first embodiments of the invention.

FIGS. 6a through 7b show another exemplary embodiment using the elements illustrated in FIG. 1. This embodiment provides image or video projection capabilities in a cellular phone or other networked communication device. FIG. 6a shows portions of a folding-type cellular phone 90. The cellular phone includes an image capture lens 92 for capturing still or video images. As shown in FIG. 6b, the cellular phone further includes a viewable display 94 that may be used for displaying video or still images that have been captured by the cellular phone or received by the cellular phone. The cellular phone also includes a keypad and other user controls 96.

The cellular phone in accordance with this exemplary embodiment also provides a projection feature for projecting video or still images that have been captured by the cellular phone, or that have been received by the cellular phone through a network link, or that are stored in the cellular phone on a fixed or removable data storage medium. In the illustrated embodiment, the projection optics are located in the hinged portion 98 of the phone body. However, in other implementations, the projection optics may be located in a different part of the phone body. Other implementations may also be provided in unit-body type cellular phones that do not have a hinged structure as shown in FIG. 6b.

Figure 6B:
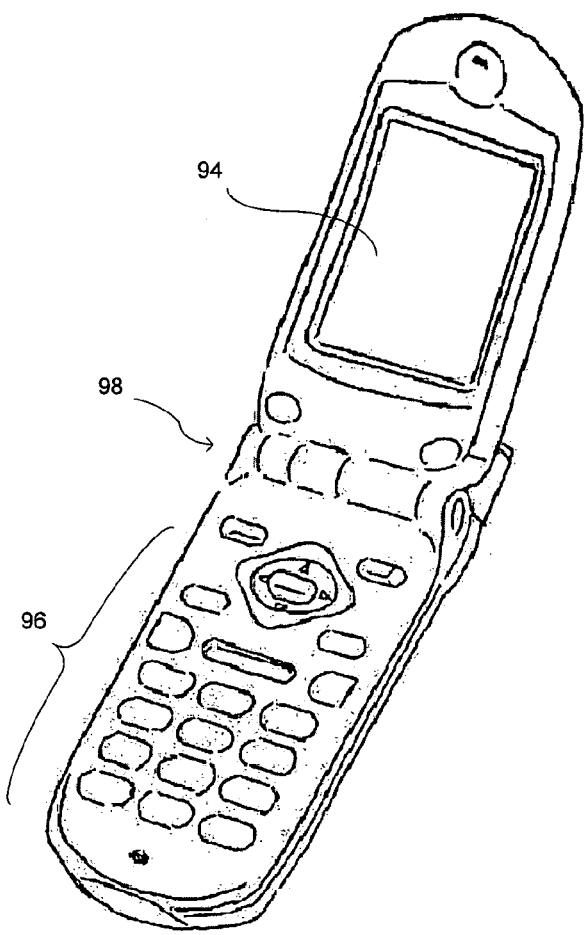
Figure 7A:
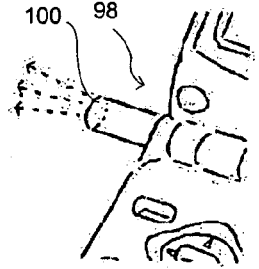
FIGS. 7a and 7b show elements of positionable projection optics of the embodiment of FIGS. 6a and 6b.
Figure 7B:
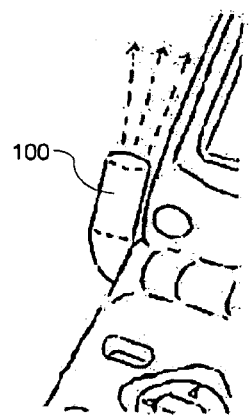

FIGS. 7a and 7b illustrate the operation of projection elements of the embodiment of FIGS. 6a and 6b. FIG. 7a shows the hinged portion of the cellular phone body, including a projection lens section 100 that extends outward from the hinged portion 98 of the cellular phone. The projection lens section 100 of this embodiment is similar to the projection lens section of the preceding embodiment, in that it is movable between a retracted position within the cellular phone housing and an extended position in which it extends outward from the cellular phone housing. FIG. 7a shows the projection lens section 100 in a straight extended position, in which the projection lens elements 100 are pointed sideward with respect to the cellular phone housing. FIG. 7b shows the projection lens section 100 in an angled position, in which the projection lens elements are oriented at a 90 degree angle with respect to the cellular phone body. In this position, the projection lens section 100 may be rotated through 360 degrees with respect to the cellular phone body. The projection lens section 100 may be implemented in a manner similar to that shown in FIGS. 5a and 5b, in that it includes a rotatable housing, a pivotable mirror or electro-optic reflection device, and pivotable projection lens elements. Depending on the implementation, the projection lens 100 may be extended, pivoted and rotated by the user manually, or may be moved electromechanically in response to operation of user controls.

The first embodiments of the invention are not limited to the exemplary embodiments described herein. Rather, a variety of alterations and additions may be made while maintaining the features of an image capture device having a positionable projection optics that are integral with the image capture device and movable with respect to the image capture device.

Second Embodiments

A variety of further embodiments of the invention may be implemented as video cameras or still image cameras that are capable of projecting images by means of a projector portion that is tethered to the camera body by a flexible cable. The projector portion may be held in the hand of a user, enabling the user to manually direct the projected image toward a desired target.

Figure 8:
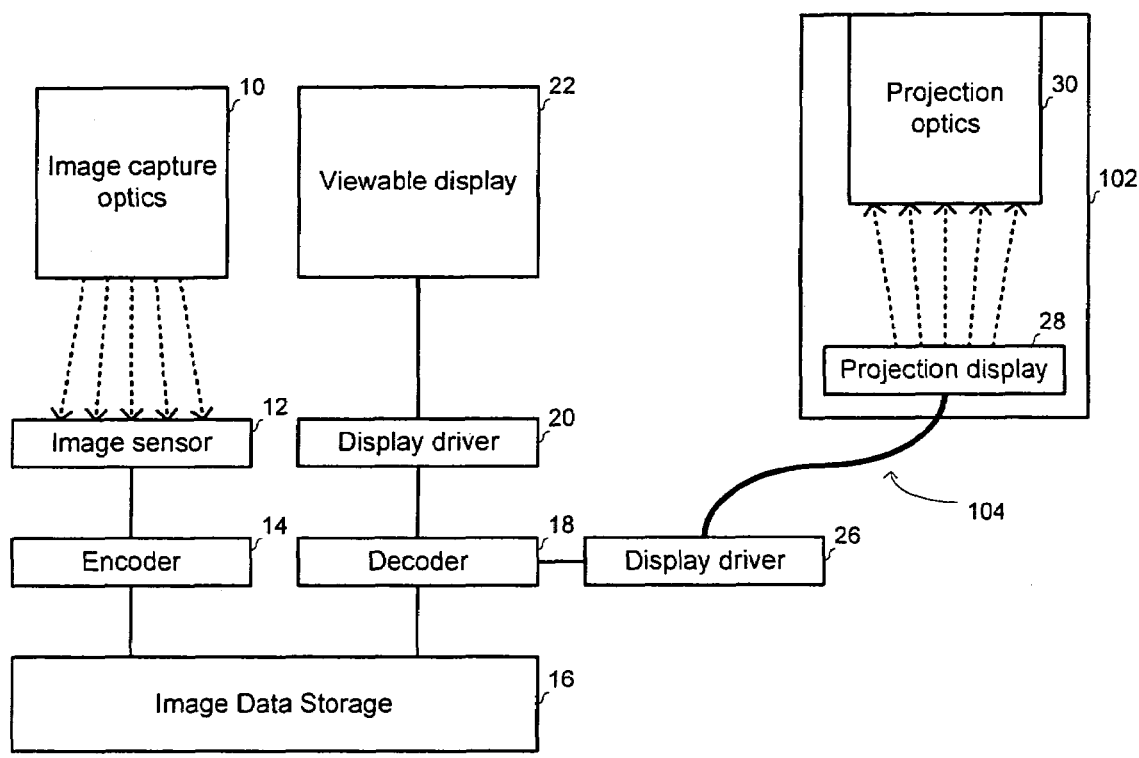
FIG. 8 shows an example of components of devices in accordance with second embodiments of the invention.

FIG. 8 shows a block diagram of electronic components and other components that may be used in implementing such embodiments of the invention. The components of FIG. 8 include components similar to those of FIG. 1, including image capture optics 10, an image sensor 12, an encoder 14, an image data storage 16, a decoder 18 that supplies decoded image data to a display driver 20 for a viewable display 22, and a display driver 26 that drives a projection display 28 for projecting an image through projection optics 30. It should be understood that alternative components may be utilized to provide the features of the first embodiments. For example, while FIG. 8 shows the use of an encoder 14 and a decoder 18, alternate embodiments may use other forms of image data that do not require encoding and decoding, such as bitmap image data.

In accordance with one example of the second embodiments of the invention, the projection display 28 and projection optics 30 are provided in a housing 102 that is tethered to the camera body by a flexible cable 104 through which power and data are supplied. This enables the user to hold the housing and manually direct the projected image in any desired manner. The housing 102 and flexible cable 104 may be separate from and detachably coupled to the camera body, or may be retractable within the body of the camera for storage when not in use.

Figure 9A:
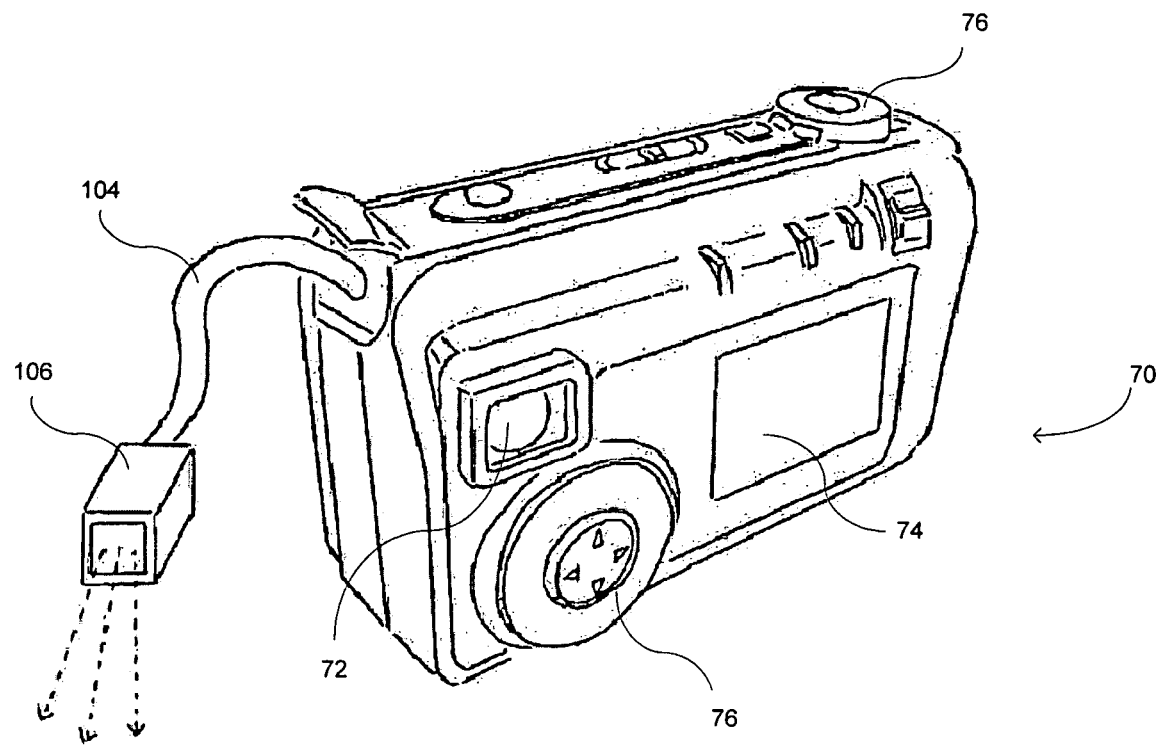
FIGS. 9a and 9b show examples of a digital still camera and a projector portion in accordance with the second embodiments of the invention.
Figure 9B:
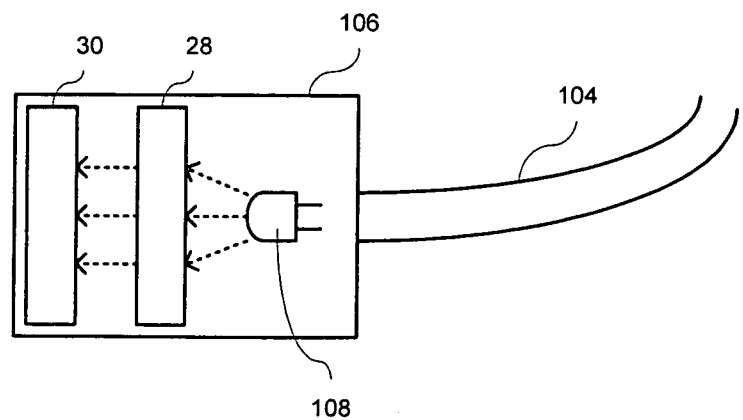

FIGS. 9a and 9b show an exemplary embodiment using components as illustrated in FIG. 8. This embodiment is implemented in a digital still camera 70. The digital still camera 70 includes conventional elements such as an optical view finder 72, an LCD view finder 74, and user controls 76. The digital still camera 70 further includes a projection lens section 106 that is tethered to the camera 70 by a flexible cable 104. The projection lens section 106 may be held in the hand of a user and pointed toward any desired target to project an image onto the target. The camera may be operated in various projection modes, including a live mode in which images are projected as they are captured by the camera, and a stored mode in which previously captured images are projected.

FIG. 9b shows details of an example of a projection lens section 106. The projection lens section 106 includes a housing 102 that contains a projection display 28 and projection optics 30. The projection optics 30 may include adjustable focusing elements for focusing the projected image. The projection display is typically implemented using a miniature LCD display. A light source 108 such as a lamp or a high powered LED such as a super-bright white LED is oriented behind the projection display as a source of illumination.

In embodiments in which the cable is detachable from the camera body, the cable 104 may be terminated by a serial port coupling that couples to a serial port connector in the camera body. The serial port may conform to a standardized serial data and power protocol such as USB or FireWire.

While the exemplary embodiment illustrated in FIGS. 9a and 9b provides a light source 108 and projection display 28 in the projection lens section 106, in one alternative embodiment the light source 108 and the projection display 28 may be provided in the camera body, and light passed through the projection display 28 may be carried to the projection optics 30 through an optical fiber or optical fiber bundle in the flexible cable. In another alternative embodiment, the light source 108 may be located in the camera body, and the projection display 28 and the projection optics 30 may be located in the housing 106. Light may be carried to the projection display 28 and the projection optics 30 from the light source 108 through an optical fiber or optical fiber bundle in the flexible cable. The flexible cable in this embodiment may also contain electrical wire for carrying data and power to the projection display 28.

Further, while the embodiment of FIG. 9a shows the use of the projection optics of FIG. 9b in a still image camera, similar projection optics may be implemented in a video camera.

The second embodiments of the invention are not limited to the exemplary embodiments described herein. Rather, a variety of alterations and additions may be made while maintaining the features of an image capture device having separate hand-held projection optics that are tethered to the device by a flexible cable.

Third Embodiments

A variety of further embodiments of the invention may be implemented in video players that include projectors that are receivable by and physically separable from the main body of the video player. The player is capable of producing an image from video data stored in a digital video storage medium such as a DVD. The projector may be received in a receiving portion of the player, causing the projector to be physically coupled to the player and establishing physical connections between power and data lines of the player and the projector. The projector may also be detached from the receiving portion of the player. When detached, video data and control signals are transmitted wirelessly between the player and the projector, and power is supplied to the projector separately. This enables the player and the projector to be coupled together and used as a unitary projection device, and allows the projector to be separated from the player and placed in a desired location for projecting an image without the need to move the entire player device.

Figure 10:
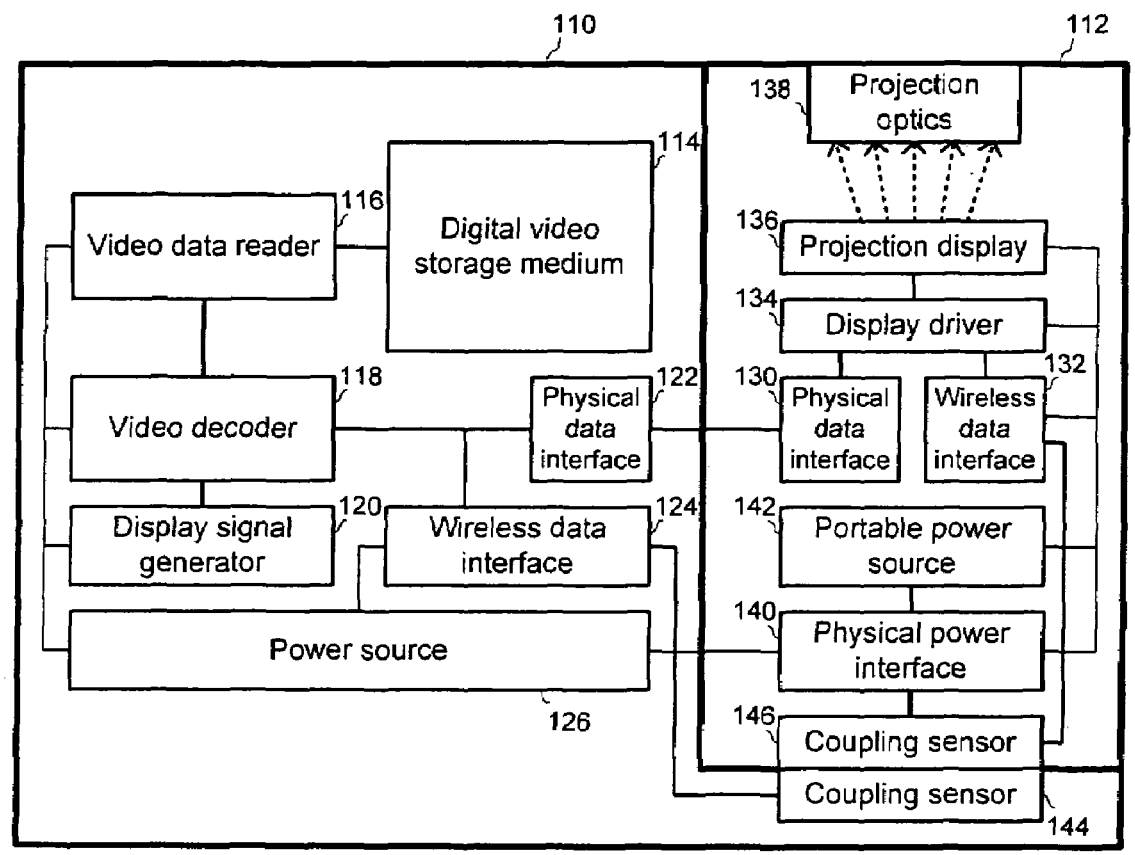
FIG. 10 shows an example of components of video player devices in accordance with third embodiments of the invention.

FIG. 10 shows a block diagram of electronic components and other components that may be used in embodiments of video players providing the aforementioned features. The video player of FIG. 10 includes a player portion 110. A projector portion 112 is coupled to the player portion 110 in a receiving portion of the player housing that is complementary to the shape of the projector portion 112. The player portion 110 and projector portion 112 are preferably structured so that the projector portion 112 is received by a receiving portion of complementary shape in the player portion 110. Latches of various types (not shown) may be used to secure the projector portion 112 to the player portion 110.

The player portion 110 may include a digital video storage medium 114 such as a DVD, hard disk, or other fixed or removable data storage medium. A video data reader 116 such as a DVD reader reads video data from the digital video storage medium 114 and supplies the data to a video decoder 118. The video decoder 118 supplies decoded video data to a display signal generator 120 that produces a displayable image signal for a television or other display device. The video decoder 118 also supplies data to a physical data interface 122 such as a set of conductive contacts that couple data to the projector when the projector is attached to the player, and to a wireless data interface 124 that transmits data to the projector when the projector is detached from the player. The wireless data interface 124 may be an 802.11a/b/g interface, a Bluetooth interface, or another high-bandwidth wireless interface. The player portion 110 also includes a power source 126 that receives power from a standard household electrical service through a power cord (not shown), supplies power to elements within the player portion 110, and couples power to the projector portion 112. The player portion also typically contains components (not shown) for decoding audio data and producing an audio signal.

The projector portion 112 includes a physical data interface 130 that is complementary to the physical data interface 122 of the player portion 110 for receiving data signals from the player portion 110 when the projector portion 112 is attached to the player portion 110. The projector portion 112 also includes a wireless data interface 132 for receiving wireless transmissions of data from the player portion 110 when the projector portion 112 is detached from the player portion 110. A display driver 134 receives video data from the physical data interface 134 or the wireless data interface 132 and supplies driving signals to a projection display 136. The projection display 136 is typically implemented as a miniature LCD display. Light is supplied from a light source, such as a lamp or a high powered LED such as a super-bright white LED, to the projection display 136 to create a projection image that is passed through projection optics 138. The projection optics 138 typically include focusing optics that may be operated manually or electromechanically by the user. The projector portion 112 also includes a physical power interface 140 that is coupleable to the power source 126 of the player through contacts (not shown) on the player portion 110 and projector portion 112 to supply power to elements of the projector portion 112. A portable power source 142 such as a rechargeable battery is also provided in the projector for supplying power to the projector elements when the projector is detached from the player. The portable power source 142 may be recharged from the power source 126 of the player portion 110 when the player portion 110 is coupled to the projector portion 112. The projector portion 112 may further include a power cord (not shown) for coupling the projector portion 112 to a standard household electrical service when not connected to the player portion. When the projector portion 112 is detached from the player portion 110, it may be powered using its power cord or the rechargeable battery. When the projector portion 112 is physically coupled to and received by the player portion 110, it receives power from the player portion 110, and the power cord is preferably storable within a space in the projector portion 112.

Each of the player portion 110 and the projector portion 112 also includes a respective coupling sensor 144, 146. Each coupling sensor detects whether the projector portion 112 is coupled to the player portion 110 and generates a control signal that is used by the elements of the player portion 110 and projector portion 112 to switch between coupled and decoupled modes of operation. While the coupling sensors 144, 146 appear to be in contact in FIG. 10, the coupling sensors may be implemented as contact sensors or as other types of sensors that do not require direct contact with each other. For example, each of the sensors may be an electromechanical sensor that detects whether the player portion 110 and the projector portion 112 are in contact. Alternatively, the coupling sensors 144, 146 may be electronic sensors that detect the presence or absence of signals on the data or power lines.

In operation, the player portion 110 reads and generates video data and signals from stored digital video content, and the video data is supplied to the projector portion 112. The player may be controlled using controls provided on the player portion 110 or the projector portion 112, or through the use of a wireless remote control. When the projector portion 112 is attached to the player portion 110, video data, control signals and power are physically coupled to the projector portion 112, and the player portion 110 and projector portion 112 are used as an integral unit for projecting a video image. When the projector portion 112 is detached from the player portion 110, the detachment is detected by sensors in the player portion 110 and the projector portion 112. This causes video data and control signals to be transmitted wirelessly from the player portion 110 to the projector portion 112, and causes power to be supplied to the elements of the projector portion 112 by the portable power source 142 within the projector portion 112 or from the power cord of the projector portion 112. In the detached mode, the projector portion 112 may be located anywhere within transmission range of the player portion 110, allowing the user to place the projector portion 112 in any desired location for projecting an image. Thus, for example, the user may insert a DVD into the player portion 110 and place the player portion 110 with the attached projector portion 112 in a location that is convenient for projecting the video image onto a surface such as a wall or projection screen. Alternatively, the user may detach the projector portion 112 from the player portion 110 and move the projector portion 112 to any of location that is within transmission range of the player portion 110, allowing the projector portion 112 to be portable within the user's space so that video can be projected at desired locations while using the player portion 110 as a stationary wireless video server.

Figure 11A:
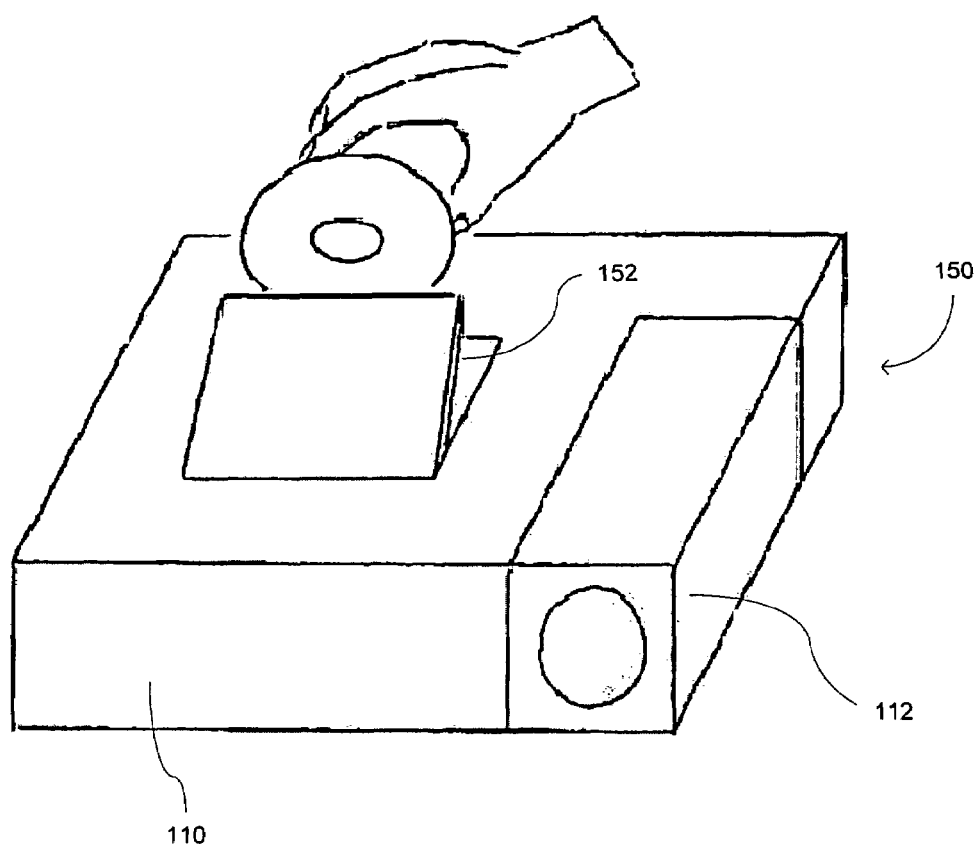
FIGS. 11a, 11b and 11c show a first example of a DVD player in accordance with the third embodiments of the invention.
Figure 11B:
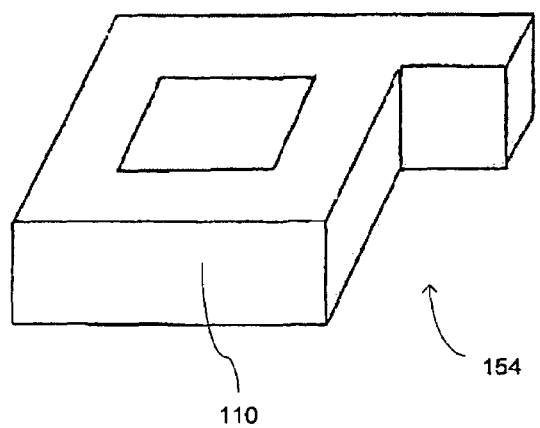
Figure 11C:
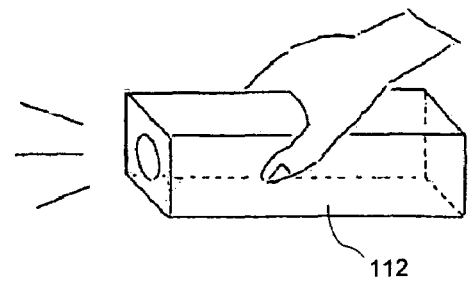

A variety of exemplary embodiments using the components illustrated in FIG. 10 are now described. A first of these embodiments is illustrated in FIGS. 11a through 11c. These figures illustrate a top loading DVD player 150 that receives a DVD in a DVD loader 152 that opens upward at the top of the DVD player 150. The projector portion 112 is coupled to the player portion 110 along a side of the player portion 110. As shown in FIG. 11b, the player portion 110 includes a receiving portion 154 that is complementary to the shape of the projector portion 112 shown in FIG. 11c.

Figure 12A:
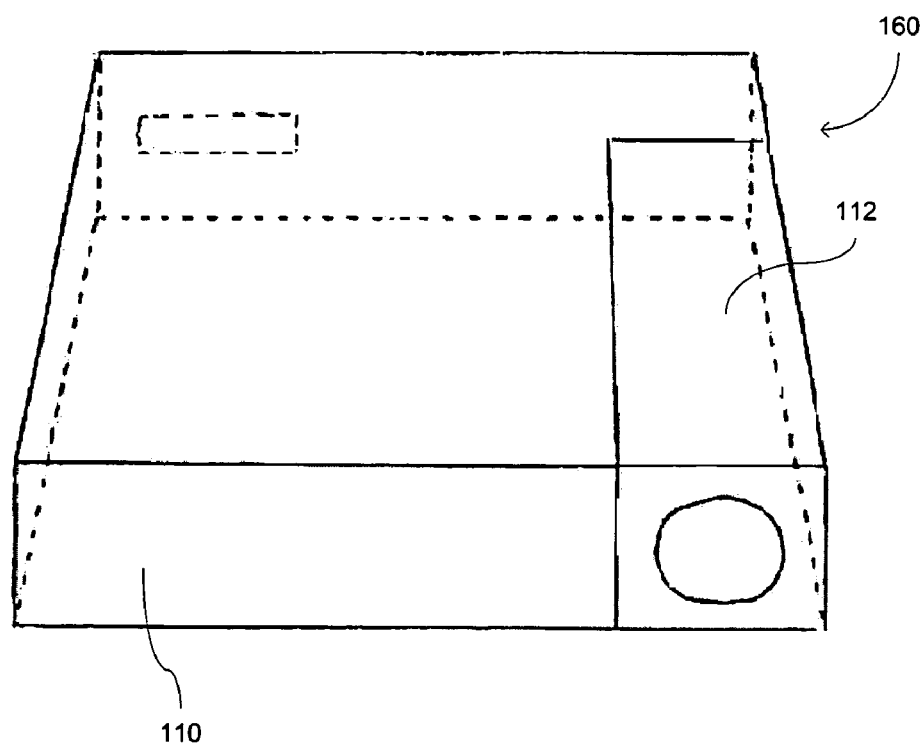
FIGS. 12a and 12b show a second example of a DVD player in accordance with the third embodiments of the invention.
Figure 12B:
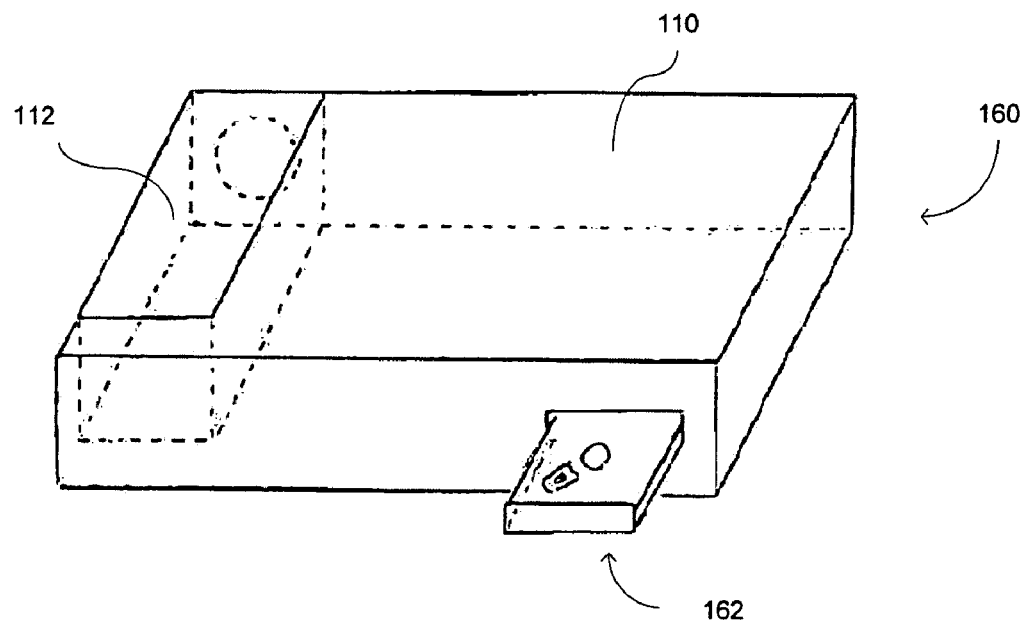

A exemplary preferred embodiment is shown in FIGS. 12a and 12b. This embodiment is similar to the embodiment of FIG. 11a, but differs in that it utilizes a DVD loader 162 in the form of a tray that extends outward from a rear surface of the player portion 110. As in the embodiment of FIG. 11a, this embodiment has a receiving portion along one side of the player portion 110 that is complementary to the shape of the projector portion 112.

Figure 13A:
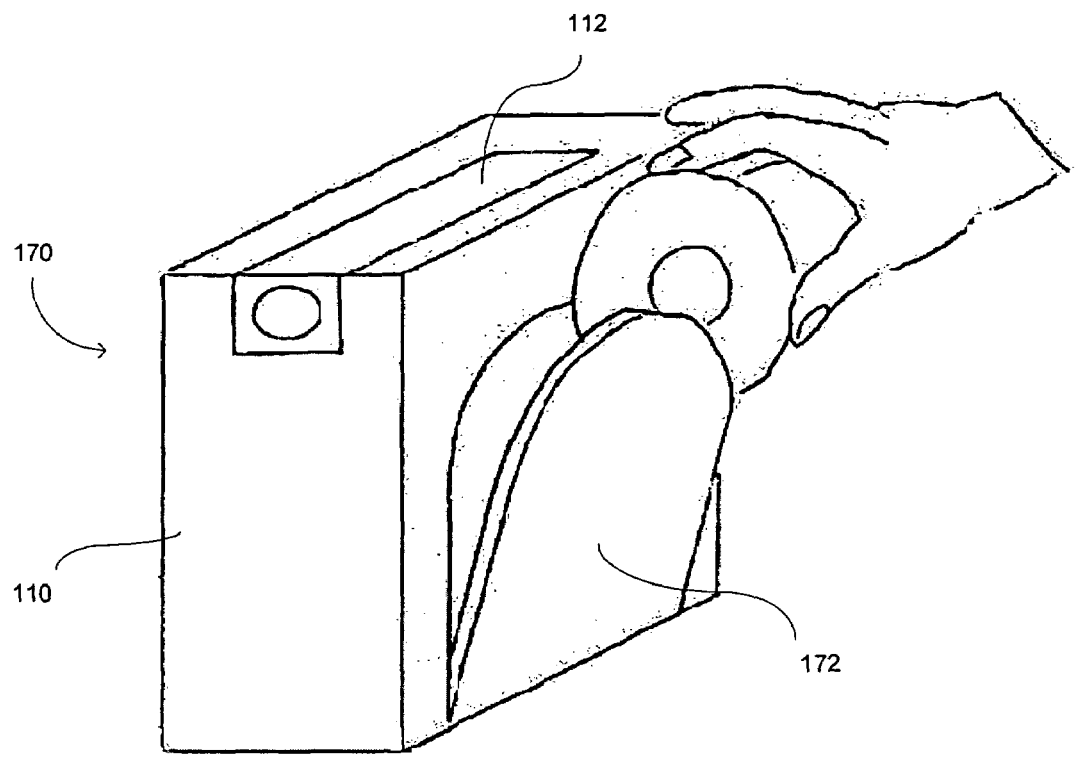
FIGS. 13a, 13b and 13c show a third example of a DVD player in accordance with the third embodiments of the invention.
Figures 13B, 13C:
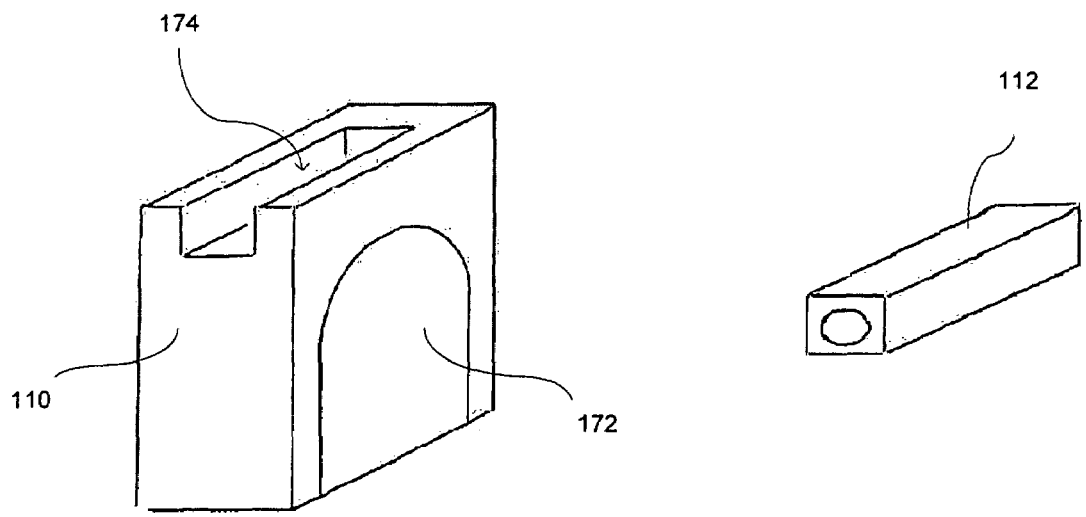

FIGS. 13a through 13c show a third exemplary embodiment of the DVD player 170 having a tower configuration. The DVD player 170 includes a side mounted DVD loader that opens at a side of the tower-shaped DVD player 170. The projector portion 112 is received in a receiving portion 174 at the top of the player portion 110 that is complementary to the shape of the projector portion 112.

Figure 14A:
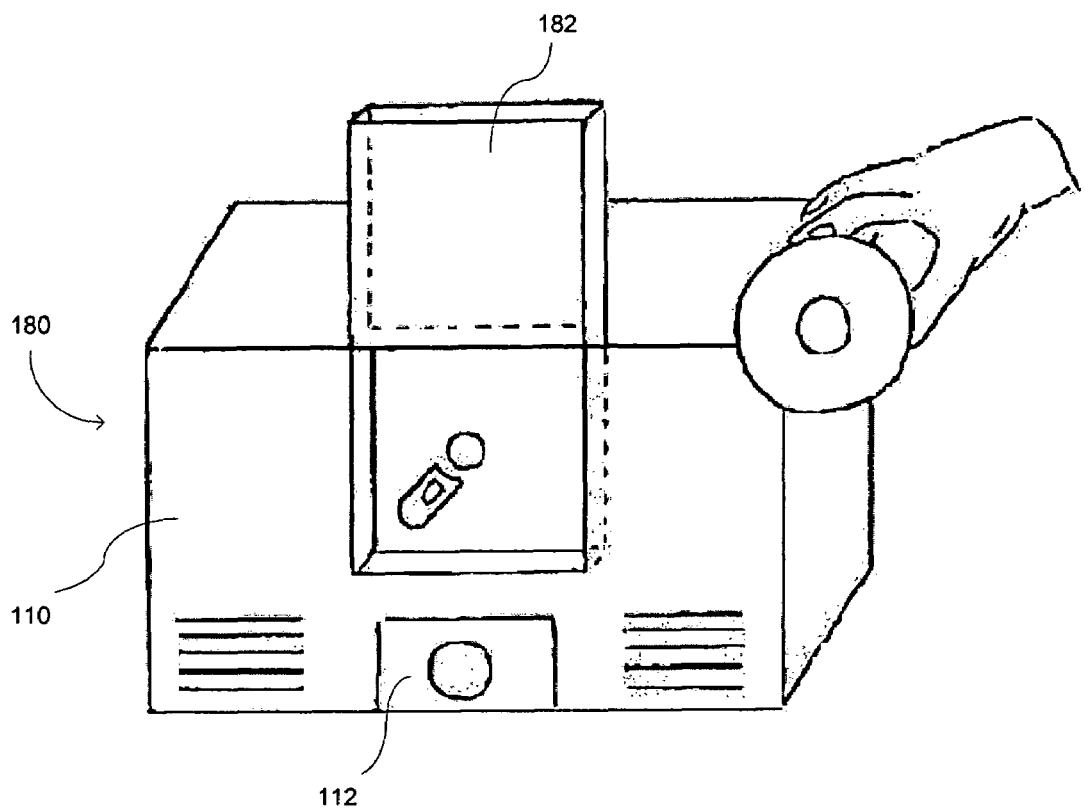
FIGS. 14a, 14b and 14c show a fourth example of a DVD player in accordance with the third embodiments of the invention.
Figure 14B:
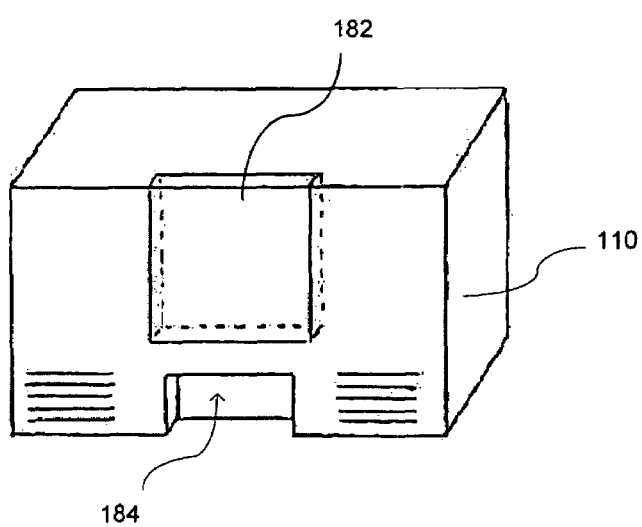
Figure 14C:
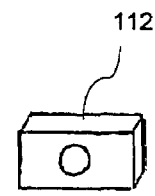

FIGS. 14a through 14c show a fourth exemplary embodiment of the DVD player 180 having a front loading configuration. A DVD is received in a DVD loader 182 that is oriented at the front of the player portion 110 and has a door that extends upward to enable with the user to insert a DVD into the player. The projector is received in a complementary receiving portion 184 beneath the DVD loader 182.

The third embodiments of the invention are not limited to the exemplary embodiments described herein. Rather, a variety of alterations and additions may be made while maintaining the features of a video player having a separable projector portion that is receivable in a complementary receiving portion of a player portion, and that receives wirelessly transmitted data from the player portion when detached from the player portion.

While the embodiments described herein are illustrated in block diagrams for purposes of explanation, the blocks in those diagrams are not intended to have a one to one correspondence with discrete circuits or hardware components. In general, the devices in which embodiments of the invention are implemented are programmable electronic devices that may include a microprocessor, nonvolatile memory storing programming code for controlling the microprocessor and other hardware, rewritable nonvolatile memory such as flash memory for storing configuration data and other data, random access memory for providing a working memory space, an image encoder/decoder, a digital signal processor, and one or more communication interfaces for receiving data or signals from, supplying data or signals to or exchanging data or signals with various user input devices and external systems or devices. Each of the elements described herein may therefore be comprised of one or more such components, which may act individually or may cooperate under the control of programmed control processes or control logic circuits.

The devices, features and processing described herein are not exclusive of other devices, features and processing, and variations and additions may be implemented in accordance with the particular objectives to be achieved. For example, devices as described above may provide additional features not specifically described herein, or may be implemented using different electronic, mechanical or programming components to achieve features described herein. Thus, the embodiments illustrated in the figures and described above are offered by way of example only. The invention is not limited to a particular embodiment, but extends to various modifications, combinations, and permutations that fall within the scope of the claims and their equivalents.

What is claimed is:

1. A device for image display, comprising:
   positionable projection optics that are integral with the device body and movable with respect to the device body for projecting an image in different directions with respect to the device body;
   a projection display for generating an image to be projected by the projection optics;
   a light source for directing light through the projection display toward the projection optics;
   a position sensor for detecting the position of the projection optics with respect to the device body; and
   an image translator for translating image data supplied to the projection display in accordance with a signal from the position sensor indicating the position of the projection optics so that the image displayed on the projection display produces a projected image that is correctly oriented with respect to the device; wherein the positionable projection optics comprise:
   lens elements that are movable between a first position that points in a direction along a direct optical path from the projection display and at least a second position that points in a direction that is at a 90 degree angle with respect to the pointing direction of the first position; and
   an electro-optical reflection device that intersects the optical path at approximately a 45 degree angle and that is electrically switchable between a primarily transmissive state and a primarily reflective state that deflects light in the optical path at approximately a 90 degree angle.

2. The device claimed in claim 1, wherein the electro-optical reflection device is rotatable about the optical path to redirect light in multiple directions at approximately a 90 degree angle with respect to the optical path.

3. The device claimed in claim 2, wherein the electro-optical reflection device is coupled to a housing that is rotatable about the optical path.

4. The device claimed in claim 3, wherein the housing is movable between a first position extending from the device and a second position retracted within the device.

5. The device claimed in claim 3, wherein the lens elements are movable between a first position extending out of an end of the housing and a second position extending out of a side of the housing.

* * * * *